US009719352B2

(12) United States Patent
Sheoran et al.

(10) Patent No.: US 9,719,352 B2
(45) Date of Patent: Aug. 1, 2017

(54) COMPARTMENT BASED INLET PARTICLE SEPARATOR SYSTEM

(71) Applicant: HONEYWELL INTERNATIONAL INC., Morristown, NJ (US)

(72) Inventors: Yogendra Yogi Sheoran, Scottsdale, AZ (US); Bruce Dan Bouldin, Phoenix, AZ (US); Marcos Alazraki, Madrid (ES); Adam Kowal, Phoenix, AZ (US); Rob Robbins, Chandler, AZ (US); Jennifer Ann Reich, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 383 days.

(21) Appl. No.: 14/573,926

(22) Filed: Dec. 17, 2014

(65) Prior Publication Data

US 2016/0177724 A1   Jun. 23, 2016

(51) Int. Cl.
*B64D 33/02* (2006.01)
*F01D 1/20* (2006.01)
(Continued)

(52) U.S. Cl.
CPC .............. *F01D 1/20* (2013.01); *B64D 33/00* (2013.01); *B64D 33/02* (2013.01); *B64D 41/00* (2013.01);
(Continued)

(58) Field of Classification Search
CPC  B64D 41/00; B64D 41/007; B64D 2041/002; B64D 33/00; B64D 33/02;
(Continued)

(56) References Cited

U.S. PATENT DOCUMENTS 3,421,296 A * 1/1969 Beurer, Sr. ............ B64D 33/02
209/710
3,449,891 A   6/1969 Shohet et al.
(Continued)

FOREIGN PATENT DOCUMENTS

EP       1686058 A1     8/2006
EP       1847458 A2 * 10/2007  ............. B64D 41/00
(Continued)

OTHER PUBLICATIONS

EP Extended Search Report for Application No. EP 15199431.6 Dated Apr. 22, 2016.

*Primary Examiner* — Benjamin P Lee
(74) *Attorney, Agent, or Firm* — Lorenz & Kopf, LLP (57) ABSTRACT

A compartment based inlet particle separator system for an aircraft that includes an auxiliary power unit (APU) system compartment is provided. The system includes a separation barrier wall, a ram air inlet opening, a diffuser, and an inlet particle separator (IPS). The separation barrier wall is disposed within the APU system compartment and divides the APU system compartment into two compartments. The ram air inlet opening is formed one of the compartments. The diffuser receives ram air from a ram air inlet opening and discharges ram air into a compartment. The IPS is disposed within the a compartment between the diffuser outlet and the APU air inlet port.

16 Claims, 5 Drawing Sheets

(51) Int. Cl.
    *B64D 41/00*     (2006.01)
    *B64D 33/00*     (2006.01)

(52) U.S. Cl.
    CPC ............ *B64D 2033/0213* (2013.01); *B64D 2033/0246* (2013.01); *B64D 2041/002* (2013.01)

(58) Field of Classification Search
    CPC ...... B64D 2033/0213; B64D 2033/022; B64D 2033/0246; F02C 7/055
    See application file for complete search history.

(56) References Cited

U.S. PATENT DOCUMENTS

| | | | |
|---|---|---|---|
| 3,673,771 A * | 7/1972 | Dickey | B01D 45/08 415/121.2 |
| 3,952,972 A | 4/1976 | Tedstone et al. | |
| 4,098,077 A | 7/1978 | Edmaier et al. | |
| 4,250,703 A | 2/1981 | Norris et al. | |
| 4,304,094 A | 12/1981 | Amelio | |
| 6,264,137 B1 | 7/2001 | Sheoran | |
| 6,520,738 B2 | 2/2003 | Sheoran et al. | |
| 6,824,582 B2 | 11/2004 | Wilson | |
| 6,942,181 B2 | 9/2005 | Dionne | |
| 7,344,107 B2 * | 3/2008 | Campbell | B64D 41/00 244/53 B |
| 7,597,283 B2 | 10/2009 | Manrique et al. | |
| 7,600,714 B2 | 10/2009 | Sheoran et al. | |
| 7,678,165 B2 | 3/2010 | Tingle et al. | |
| 8,444,083 B2 * | 5/2013 | Light | B64D 41/00 244/129.4 |
| 9,254,924 B2 * | 2/2016 | Nager | B64D 41/00 |
| 9,314,723 B2 * | 4/2016 | Judd | B01D 45/04 |
| 2002/0182062 A1 * | 12/2002 | Scimone | B64D 33/02 415/121.2 |
| 2003/0080244 A1 * | 5/2003 | Dionne | B64D 33/08 244/57 |
| 2003/0183272 A1 * | 10/2003 | Schnoor | B64D 33/02 137/15.1 |
| 2006/0059891 A1 * | 3/2006 | Sheoran | B64D 41/00 60/269 |
| 2006/0163425 A1 * | 7/2006 | Brown | B64D 41/00 244/53 B |
| 2006/0196993 A1 * | 9/2006 | Hein | B64D 33/12 244/53 B |
| 2008/0098743 A1 * | 5/2008 | Judd | B64D 33/04 60/772 |
| 2008/0152500 A1 | 6/2008 | Mehring | |
| 2011/0001003 A1 | 1/2011 | Krahl | |
| 2011/0265650 A1 * | 11/2011 | Kazlauskas | B64D 33/02 95/269 |
| 2014/0119891 A1 | 5/2014 | Schmittenberg et al. | |
| 2014/0182306 A1 * | 7/2014 | Castagnera | F28D 7/00 60/784 |
| 2014/0202121 A1 * | 7/2014 | Beers | F02C 7/05 55/306 |
| 2014/0260127 A1 * | 9/2014 | Boyce | B64D 33/02 55/306 |
| 2014/0294564 A1 | 10/2014 | Matwey et al. | |

FOREIGN PATENT DOCUMENTS

| | | | |
|---|---|---|---|
| EP | 3034408 A1 * | 6/2016 | ............ B64D 33/00 |
| WO | 2010077241 A1 | 7/2010 | |
| WO | WO 2010077241 A1 * | 7/2010 | ............ B64D 33/02 |

* cited by examiner

COMPARTMENT BASED INLET PARTICLE SEPARATOR SYSTEM

TECHNICAL FIELD

The present invention generally relates to inlet particle separator systems for auxiliary power units (APUs), and more particularly relates to compartment based inlet particle separator systems for aircraft that include an APU system compartment.

BACKGROUND

In many aircraft, the main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include an auxiliary power unit (APU) to supplement the main propulsion engines in providing electrical and/or pneumatic power. An APU may also be used to start the propulsion engines.

Many APU-equipped aircraft are operated in environments that have a high concentration of fine dust particles (e.g., <30 μm) suspended in the air. These fine dust particles, when ingested by the APU, can adversely impact the APU. For example, the fine dust particles can plug the holes in effusion cooled combustors, and can plug and corrode the high temperature turbine passages and hardware. To alleviate the adverse impact of dust particles, many aircraft include an inlet particle separator system (IPS).

Most IPSs are designed to separate out relatively large particles (e.g., 100 μm<1000 μm) but are less efficient at separating out fine particles. This is because these systems typically rely on particle inertia to move the particles into a separate collector and scavenge system. Fine particles, with relatively lower inertia, are much more inclined to follow the inlet airflow into the gas turbine engine, resulting in low separation efficiencies. Thus, many aircraft additionally include one or more systems to remove these fine particles. These additional systems include barrier filters (self-cleaning and non-self-cleaning), vortex panels, and multi-channel particle separator (MCPS) systems.

Although the three particle separator systems just mentioned do excel at removing fine particles from APU inlet airflow, they all exhibit certain drawbacks. In particular, each is designed to be relatively large in size in order to minimize pressure losses. This size requirement negates the ability to mount these systems outside of the aircraft or inside the already existing APU inlet duct system.

Hence, there is a need for a particle separator system that can remove fine dust particles from APU inlet airflow, exhibit minimal pressure losses, and be incorporated into the APU air inlet system. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a compartment based inlet particle separator system for an aircraft that includes an auxiliary power unit (APU) system compartment, includes a separation barrier wall, a ram air inlet opening, a diffuser, and an inlet particle separator (IPS). The separation barrier wall is disposed within the APU system compartment and is configured to divide the APU system compartment into an air inlet compartment and an APU compartment. The separation barrier wall has an APU air inlet port formed therein that provides fluid communication between the air inlet compartment and the APU compartment. The ram air inlet opening is formed in the air inlet compartment for receiving a flow of ram air. The diffuser is disposed within the air inlet compartment and has a diffuser inlet and a diffuser outlet. The diffuser inlet is coupled to receive ram air from the ram air inlet opening. The diffuser outlet is in fluid communication with, and is configured to discharge ram air into, the air inlet compartment. The IPS is disposed within the air inlet compartment between the diffuser outlet and the APU air inlet port.

In another embodiment, an auxiliary power unit (APU) air inlet system for an aircraft that includes an APU system compartment includes a separation barrier wall, a ram air inlet opening, a diffuser, a plurality of flow control surfaces, and an inlet particle separator (IPS). The separation barrier wall is disposed within the APU system compartment and is configured to divide the APU system compartment into an air inlet compartment and an APU compartment. The separation barrier wall has an APU air inlet port formed therein that provides fluid communication between the air inlet compartment and the APU compartment. The ram air inlet opening is formed in the air inlet compartment for receiving a flow of ram air. The diffuser is disposed within the air inlet compartment and has a diffuser inlet, a diffuser outlet, and a bypass port disposed between the diffuser inlet and the diffuser outlet. The diffuser inlet is coupled to receive ram air from the ram air inlet opening. The diffuser outlet is in fluid communication with, and is configured to discharge ram air into, the air inlet compartment. The bypass port is in fluid communication with the APU air inlet port. The flow control surfaces are rotationally mounted within the diffuser and are movable between a first position, in which the flow control surfaces direct ram air through the bypass port and into the APU air inlet port, and a second position, in which the flow control surfaces direct ram air through the diffuser outlet. The inlet particle separator (IPS) is disposed within the air inlet compartment between the diffuser outlet and the APU air inlet port.

In yet another embodiment, an auxiliary power unit (APU) air inlet system for an aircraft that includes an APU system compartment includes a separation barrier wall, a ram air inlet opening, a transverse diffuser, an inlet particle separator (IPS), and an APU. The separation barrier wall is disposed within the APU system compartment and is configured to divide the APU system compartment into an air inlet compartment and an APU compartment. The separation barrier wall has an APU air inlet port formed therein that provides fluid communication between the air inlet compartment and the APU compartment. The ram air inlet opening is formed in the air inlet compartment for receiving a flow of ram air. The transverse diffuser is disposed within the air inlet compartment and has a diffuser inlet and a diffuser outlet. The diffuser inlet is coupled to receive ram air from the ram air inlet opening. The diffuser outlet is in fluid communication with, and is configured to discharge ram air into, the air inlet compartment. The IPS is disposed within the air inlet compartment between the diffuser outlet and the APU air inlet port. The APU is disposed within the APU compartment, and has an air inlet in fluid communication with the APU air inlet port.

Furthermore, other desirable features and characteristics of the compartment based inlet particle separator system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
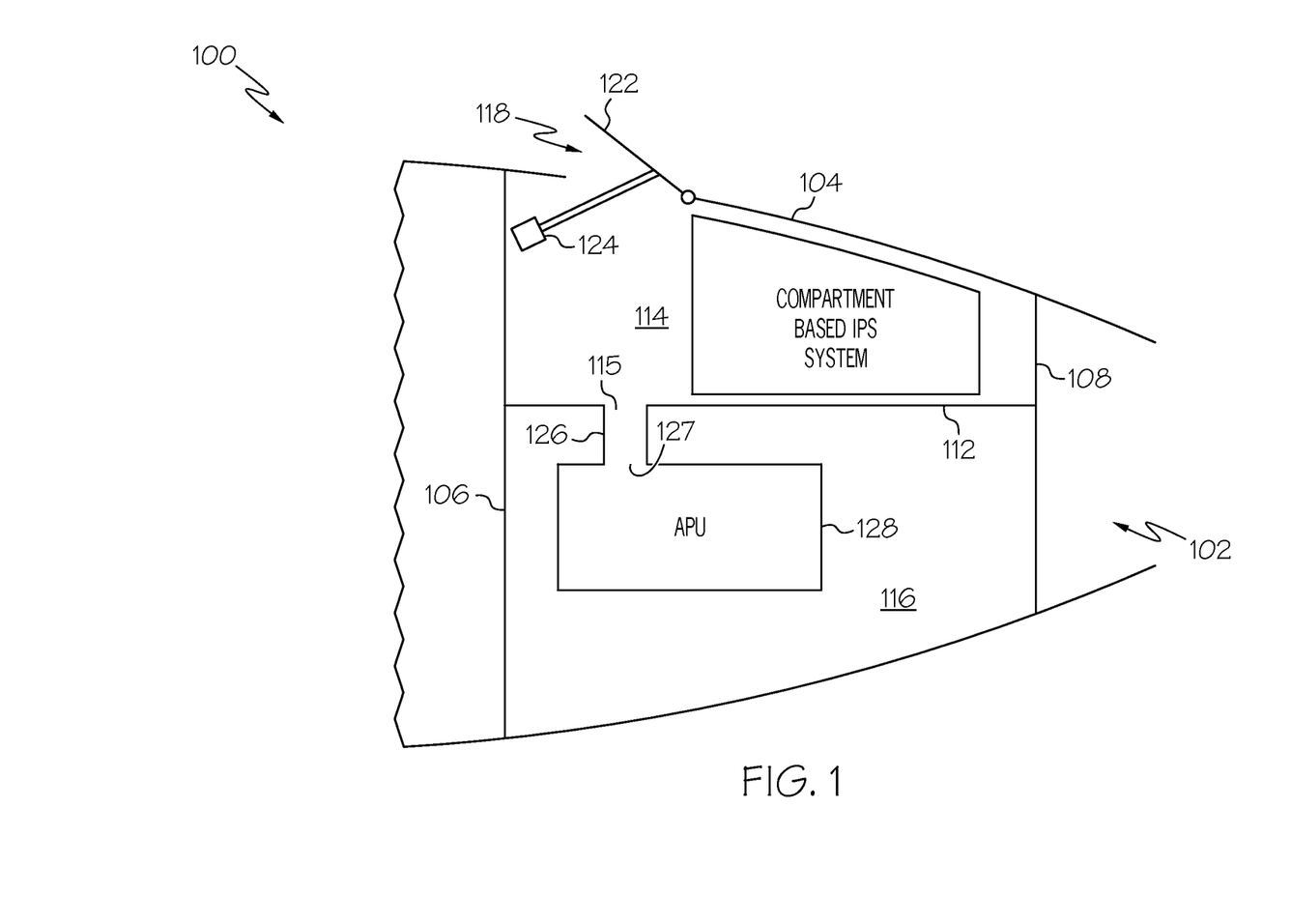
FIG. 1 depicts a simplified cross-sectional schematic of a tail cone portion of an aircraft.

Turning now to FIG. 1, a cross-sectional schematic of a tail cone portion of an aircraft 100 is depicted. The aircraft 100 includes an auxiliary power unit (APU) system compartment 102 that is defined by an exterior surface 104, a forward firewall 106, and an aft firewall 108. As is generally known, the forward firewall 106 separates the APU system compartment 102 from other sections of the aircraft 100. In the depicted embodiment, the APU system compartment 102 is formed in the tailcone section of the aircraft 100. It will be appreciated, however, that this is merely exemplary, and that the APU system compartment 102 could be formed in any one of numerous other sections of the aircraft 100. It will additionally be appreciated that, depending on its location in the aircraft 100, the APU system compartment 102 may be defined by only one forward firewall 106 or aft firewall 108.

No matter its specific location, the APU system compartment 102 additionally includes a separation barrier wall 112. The separation barrier wall 112 extends between the forward firewall 106 and the aft firewall 108, and divides the APU system compartment 102 into two separate compartments— an air inlet compartment 114 and an APU compartment 116. As FIG. 1 also depicts, the separation barrier wall 112 has an APU air inlet port 115 formed therein that provides fluid communication between the air inlet compartment 114 and an inlet to an APU 128.

As FIG. 1 also depicts, a ram air inlet opening 118 is formed in the air inlet compartment 114 and extends through the exterior surface 104 of the aircraft 100. As is generally known, the ram air inlet opening 118 is configured to selectively receive a flow of ram air. To facilitate this, an inlet door 122 and an inlet door actuator 124 are also preferably coupled to the APU system compartment 102. The inlet door 122 is coupled to receive an actuation drive force from the inlet door actuator 124 and is configured, in response to the actuation drive force, to move between a closed position and a plurality of open positions. In the closed position, the inlet door 122 prevents ram air from flowing into the ram air inlet opening 118. Conversely, in any one of the plurality of open positions, ram air may flow into the ram air inlet opening 118.

Figure 2:
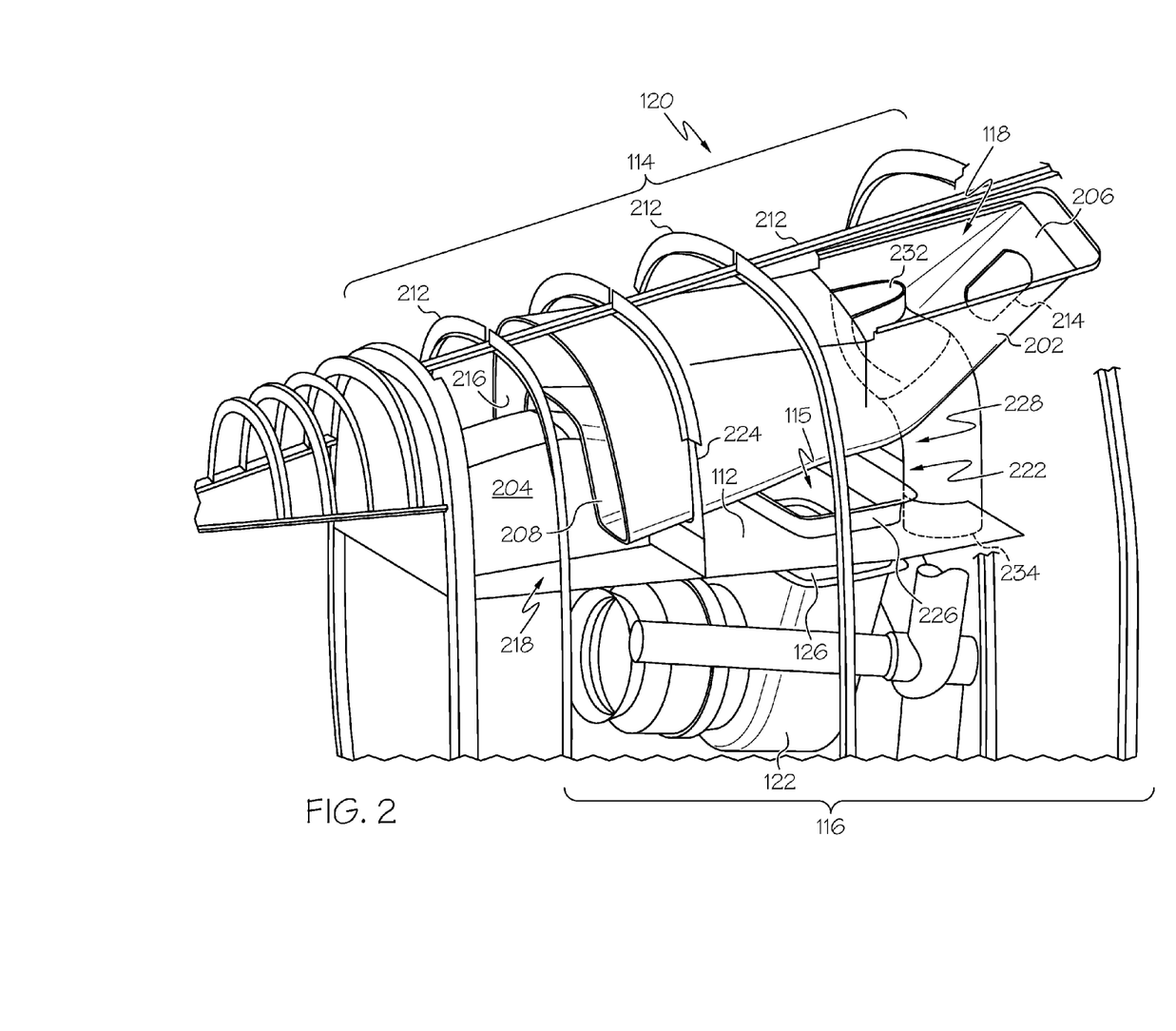
FIGS. 2 and 3 depict example embodiments of compartment based inlet particle separator systems that may be implemented in the aircraft depicted in FIG. 1.
Figure 3:
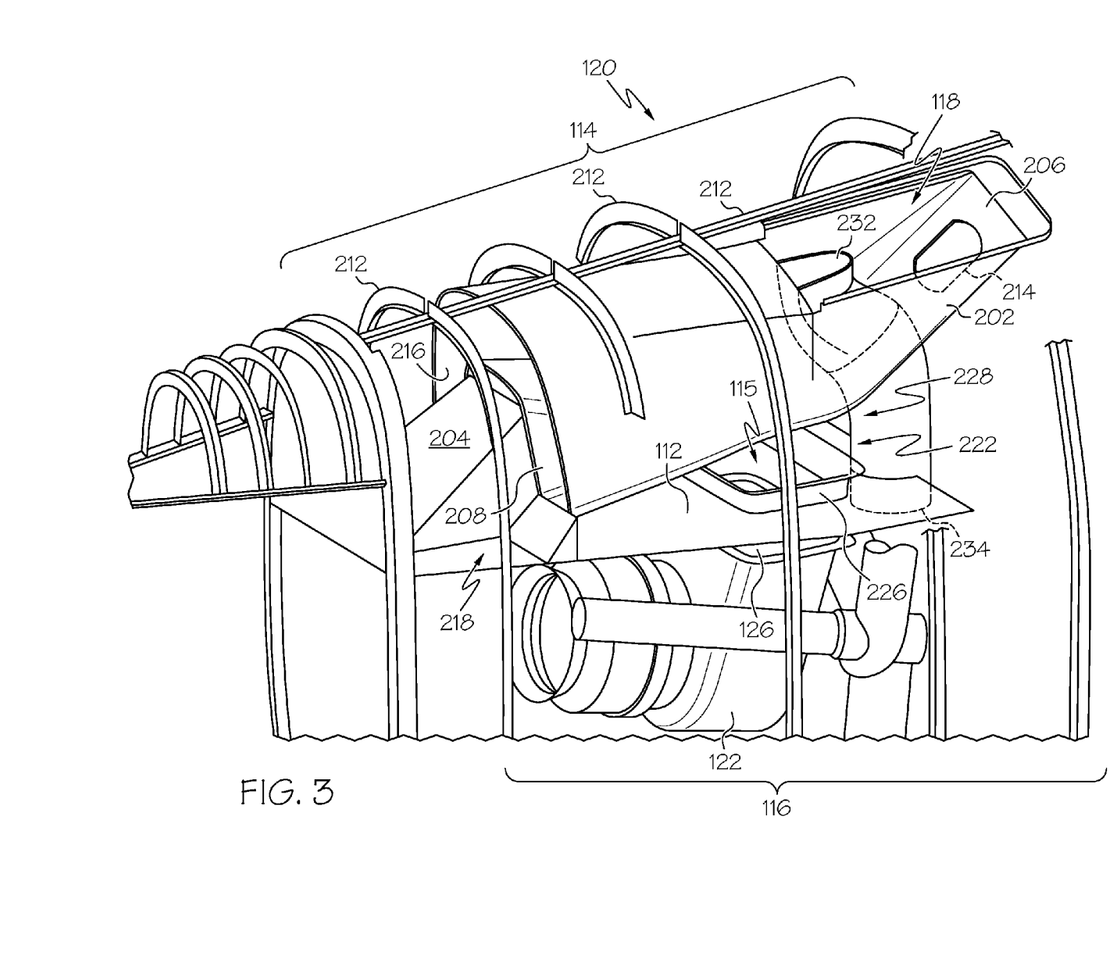

As FIG. 1 further depicts, a compartment based inlet particle separator system 120 is disposed within the air inlet compartment 114, and an APU 128 is disposed within the APU compartment 116. A more detailed representation of example physical embodiments of the compartment based inlet particle separator system 120 are depicted in FIGS. 2 and 3, and will momentarily be described. Before doing so, however, it is noted that the APU 128 has an air inlet 127 that is in fluid communication with the APU air inlet port 115 via an APU inlet duct 126 that extends from the APU 128.

Turning now to FIG. 2, the compartment based inlet particle separator system 120 includes a diffuser 202 and an inlet particle separator (IPS) 204. The diffuser 202 is disposed within the air inlet compartment 114 and has a diffuser inlet 206 and a diffuser outlet 208. The diffuser inlet 206 is coupled to receive ram air from the ram air inlet opening 118, and the diffuser outlet 208 is in fluid communication with the air inlet compartment 114. The diffuser 202 is configured to reduce the velocity of the ram air that flows into the ram air inlet opening 118, and discharge the ram air, via the diffuser outlet 208, into the air inlet compartment 114. The reduced velocity reduces the loss in pressure of the ram air as it dumps from diffuser outlet 208 to air inlet compartment 114.

The diffuser 202 may be variously disposed, but in the depicted embodiment it is disposed as close as possible to the wall (not illustrated) of the tailcone 102, while still allowing room from the structural ribs 212. The inlet door actuator 124, which is also not depicted in FIG. 2, is preferably disposed in the opening 214 in the diffuser 202.

The diffuser 202 is preferably configured as a transverse diffuser. In this regard, the diffuser 202 includes an inner surface 216 that defines a cross sectional flow area that increases between the diffuser inlet 206 and the diffuser outlet 208. The increase in flow area is transverse to the external flow momentum. The diffuser 202 is additionally configured such that it has a first height and a first width adjacent to the diffuser inlet 206, and transitions to a second height and a second width adjacent to the diffuser outlet 208, where the first height is greater than the second height, and the first width is less than the second width. As a result, the diffusion efficiency is improved, and the risk of flow separation within the diffuser 202 is significantly reduced. This is achieved by "squeezing" the flow of ram air through the reduced height and into the increased width. Thus, by the time the ram air is discharged from the diffuser outlet 208 and into the air inlet compartment 114, its velocity has been sufficiently slowed so that the pressure loss associated with the dump is minimal.

The IPS 204 is also disposed within the air inlet compartment 114. More specifically, it is disposed between the diffuser outlet 208 and the APU air inlet port 115, and divides the air inlet compartment 114 into two sections—a non-filtered section 218 and a filtered section 222. The non-filtered section 218 receives the ram air discharged from the diffuser 202, and the filtered section 222 receives filtered air discharged from the IPS 204. It will be appreciated that the IPS may be implemented using any one of numerous known IPSs that are configured to remove relatively fine dust particles (e.g., <30 μm) and larger particles from the air discharged from the diffuser 202. Some non-limiting examples of suitable IPSs include vortex panels, barrier filters, and multi-channel particle separators (MCPSs).

Regardless of the specific IPS 204 that is used, the IPS 204 is preferably disposed beneath the diffuser 202 and intercepts the airflow as it reverses direction inside the non-filtered section 218 of the air inlet compartment 114. The embodiment depicted in FIG. 2 illustrates how either a plurality of vortex panels or a plurality barrier filters are preferably disposed in the air inlet compartment. Preferably, the vortex panels or barrier filters occupy the entire space below the diffuser 202 and above the separation barrier wall 112, and extend the entirety of the non-filtered section 218 of the air inlet compartment 114 from side wall to side wall (for clarity, the sidewalls are not depicted). This ensures that all of the ram air discharged from the diffuser 202 passes through the IPS 204. Moreover, the region that is not occupied by the IPS 204 (e.g., the region above the diffuser 204) includes a wall 224 to ensure all of the ram air discharged from the diffuser 202 flow through the IPS 204.

It should be noted that when the IPS 204 is implemented using a plurality of barrier filters, the type of barrier filters may be either non-self-cleaning or self-cleaning. If non-self-cleaning barrier filters are used, the filters should be periodically checked, removed, and cleaned. Self-cleaning barrier filters are less desirable since this type of IPS 204 will typically occupy more space due to the additional hardware needed to implement the self-cleaning functionality.

The vortex panel and barrier filter configurations require approximately the same amount of surface area to keep pressure losses to a minimum, and are thus very similar in size. As such, both configurations are illustrated using FIG. 2. However, the MCPSs exhibit relatively lower pressure losses as compared to the vortex panels or barrier filters. Consequently, and as depicted in FIG. 3, when the IPS 204 is implemented using MCPSs, the IPS 204 is smaller as compared to the other two types of IPSs 204. It will be appreciated that the MCPSs can be disposed in a horizontal or vertical arrangement. Though not depicted in FIG. 3, it will be appreciated that the region that is not occupied by the IPS 204 (e.g., the region above the diffuser 204) includes the wall 224 to ensure all of the ram air discharged from the diffuser 202 flow through the IPS 204.

As FIGS. 2 and 3 additionally depict, a bellmouth structure 226 extends from the APU inlet port 115 into the air inlet compartment 114. The bellmouth structure 226 is preferably coupled to the APU inlet duct 126, and is configured to minimize losses as air flows into the APU inlet duct 126. The bellmouth structure 226 is preferably disposed above the separation barrier wall 112 to prevent any particles or FOD (foreign object debris) that may be lying on the separation barrier wall 112 to be sucked into the APU 128.

An APU compartment cooling duct 228 is also depicted in FIGS. 2 and 3. The APU compartment cooling duct 228 includes a cooling air inlet 232 and a cooling air outlet 234, and extends through the separation barrier wall 112. The cooling air inlet 232 is in fluid communication with the ram air inlet opening 118, and the cooling air outlet 234 is in fluid communication with the APU compartment 116. Thus, whenever the inlet door 122 is in an open position, ambient air is drawn into the APU compartment 116 to provide APU compartment and oil cooling air, which is drawn via a non-illustrated APU exhaust eductor system.

Figure 4:
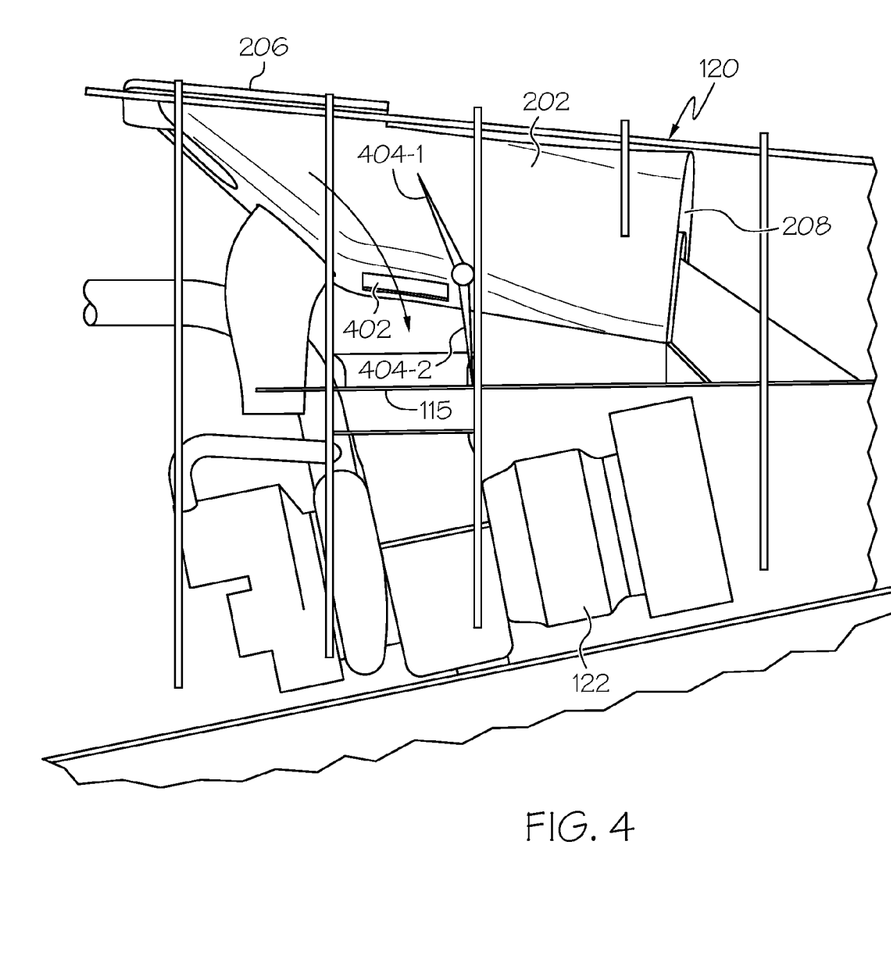
FIGS. 4 and 5 depict another example embodiment of a compartment based inlet particle separator system that may be implemented in the aircraft depicted in FIG. 1.
Figure 5:
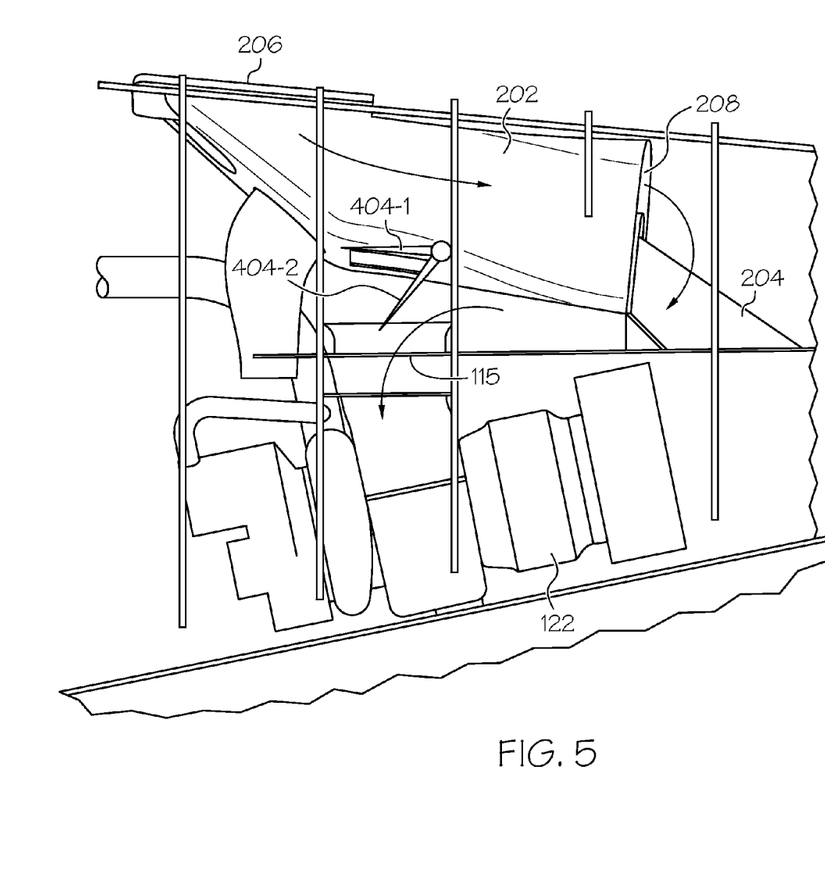

There may be instances in which aircraft 100 may only operate part-time environments with a heavy concentration of suspended particulate in the air. As such, the APUs 122 in these aircraft 100 may only operate part-time in these environments. Although the compartment based inlet particle separator systems 120 depicted and described herein exhibit relatively low pressure loss, the systems nonetheless do exhibit some pressure loss. Thus, in some embodiments, such as the one depicted in FIGS. 4 and 5, the compartment based inlet particle separator system 120 additionally implements a bypass function. To facilitate this function, the diffuser 202 additionally includes a bypass port 402. The bypass port 402 is disposed between the diffuser inlet 206 and the diffuser outlet 208, and is in fluid communication with the APU air inlet port 115.

The system 120 additionally includes a plurality of flow control surfaces 404 (404-1, 404-2). The flow control surfaces 404 are rotationally mounted within the diffuser 202 and are movable between a first position and a second position. In the first position, which is the position depicted in FIG. 4, the flow control surfaces 404 direct ram air through the bypass port 402 and directly into the APU air inlet port 115. In the second position, which is the position depicted in FIG. 5, the flow control surfaces 404 direct the ram air through the diffuser outlet 208, through the IPS 204, and into the APU air inlet port 115. Though not depicted in FIGS. 4 and 5, the flow control surfaces 404 may be moved via the inlet door actuator 124 or a separate, non-illustrated actuator.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A compartment based inlet particle separator system for an aircraft that includes an auxiliary power unit (APU) system compartment, the system comprising:
   a separation barrier wall disposed within the APU system compartment and configured to divide the APU system compartment into an air inlet compartment and an APU compartment, the separation barrier wall having an APU air inlet port formed therein that provides fluid communication between the air inlet compartment and the APU compartment;
   a ram air inlet opening formed in the air inlet compartment for receiving a flow of ram air;
   a diffuser disposed within the air inlet compartment and having a diffuser inlet, a diffuser outlet, a bypass port disposed between the diffuser inlet and the diffuser outlet, an inner surface that defines a cross sectional flow area, a first height and a first width adjacent the diffuser inlet, and a second height and a second width adjacent the diffuser outlet, the cross sectional flow area increasing between the diffuser inlet and the diffuser outlet, the first height greater than the second height, the first width less than the second width, the diffuser inlet coupled to receive ram air from the ram air inlet opening, the diffuser outlet in fluid communication with, and configured to discharge ram air into, the air inlet compartment, the bypass port in fluid communication with the APU air inlet port;
   a plurality of flow control surfaces rotationally mounted within the diffuser and movable between a first position, in which the flow control surfaces direct ram air through the bypass port and into the APU air inlet port, and a second position, in which the flow control surfaces direct ram air through the diffuser outlet; and
   an inlet particle separator (IPS) disposed within the air inlet compartment between the diffuser outlet and the APU air inlet port.

2. The system of claim 1, wherein:
   the IPS system divides the air inlet compartment into a non-filtered section and a filtered section;
   the non-filtered section receives the ram air discharged from the diffuser; and
   the filtered section receives filtered air discharged from the IPS system.

3. The system of claim 1, wherein the IPS comprises a plurality of vortex panels.

4. The system of claim 1, wherein the IPS comprises a plurality of barrier filters.

5. The system of claim 4, wherein the barrier filters are configured as self-cleaning barrier filters.

6. The system of claim 1, wherein the IPS comprises a multi-channel particle separator (MCPS) system.

7. The system of claim 1, further comprising:
   a bellmouth structure extending from the APU air inlet port into the air inlet compartment.

8. The system of claim 1, wherein:
   the IPS system divides the air inlet compartment into a non-filtered section and a filtered section;
   the non-filtered section receives the ram air discharged from the diffuser; and
   the filtered section receives filtered air discharged from the IPS system.

9. The system of claim 1, further comprising:
   an APU compartment cooling duct including a cooling air inlet and a cooling air outlet and extending through the separation barrier wall, the cooling air inlet in fluid communication with the ram air inlet opening, the cooling air outlet in fluid communication with the APU compartment.

10. An auxiliary power unit (APU) air inlet system for an aircraft that includes an APU system compartment, the APU air inlet system comprising:
    a separation barrier wall disposed within the APU system compartment and configured to divide the APU system compartment into an air inlet compartment and an APU compartment, the separation barrier wall having an APU air inlet port formed therein that provides fluid communication between the air inlet compartment and the APU compartment;
    a ram air inlet opening formed in the air inlet compartment for receiving a flow of ram air;
    a diffuser disposed within the air inlet compartment and having a diffuser inlet, a diffuser outlet, and a bypass port disposed between the diffuser inlet and the diffuser outlet, the diffuser inlet coupled to receive ram air from the ram air inlet opening, the diffuser outlet in fluid communication with, and configured to discharge ram air into, the air inlet compartment, the bypass port in fluid communication with the APU air inlet port;
    a plurality of flow control surfaces rotationally mounted within the diffuser and movable between a first position, in which the flow control surfaces direct ram air through the bypass port and into the APU air inlet port, and a second position, in which the flow control surfaces direct ram air through the diffuser outlet; and
    an inlet particle separator (IPS) disposed within the air inlet compartment between the diffuser outlet and the APU air inlet port.

11. The system of claim 10, wherein:
    the IPS system divides the air inlet compartment into a non-filtered section and a filtered section;
    the non-filtered section receives the ram air discharged from the diffuser; and
    the filtered section receives filtered air discharged from the IPS system.

12. The system of claim 10, wherein the IPS is selected from the group consisting of a plurality of vortex panels, a plurality of barrier filters, and a multi-channel particle separator (MCPS) system.

13. The system of claim 10, further comprising:
    a bellmouth structure extending from the APU air inlet port into the air inlet compartment.

14. The system of claim 10, wherein the diffuser is configured as a transverse diffuser.

15. The system of claim 10, further comprising:
    an APU compartment cooling duct including a cooling air inlet and a cooling air outlet and extending through the separation barrier wall, the cooling air inlet in fluid communication with the ram air inlet opening, the cooling air outlet in fluid communication with the APU compartment.

16. An auxiliary power unit (APU) air inlet system for an aircraft that includes an APU system compartment, the APU air inlet system comprising:
    a separation barrier wall disposed within the APU system compartment and configured to divide the APU system compartment into an air inlet compartment and an APU compartment, the separation barrier wall having an APU air inlet port formed therein that provides fluid communication between the air inlet compartment and the APU compartment;

a ram air inlet opening formed in the air inlet compartment for receiving a flow of ram air;

a transverse diffuser disposed within the air inlet compartment and having a diffuser inlet, a diffuser outlet, and a bypass port disposed between the diffuser inlet and the diffuser outlet, the diffuser inlet coupled to receive ram air from the ram air inlet opening, the diffuser outlet in fluid communication with, and configured to discharge ram air into, the air inlet compartment, the bypass port in fluid communication with the APU air inlet port;

a plurality of flow control surfaces rotationally mounted within the diffuser and movable between a first position, in which the flow control surfaces direct ram air through the bypass port and into the APU air inlet port, and a second position, in which the flow control surfaces direct ram air through the diffuser outlet;

an inlet particle separator (IPS) disposed within the air inlet compartment between the diffuser outlet and the APU air inlet port; and an APU disposed within the APU compartment, the APU having an air inlet in fluid communication with the APU air inlet port.

\* \* \* \* \*

UNITED STATES PATENT AND TRADEMARK OFFICE
CERTIFICATE OF CORRECTION

| | | |
|---|---|---|
| PATENT NO. | : 9,719,352 B2 | Page 1 of 1 |
| APPLICATION NO. | : 14/573926 | |
| DATED | : August 1, 2017 | |
| INVENTOR(S) | : Sheoran et al. | |

It is certified that error appears in the above-identified patent and that said Letters Patent is hereby corrected as shown below:

On the Title Page

Item (57), Line 8 of the Abstract, after "formed" insert -- in --
Line 11 of the Abstract, after "within" delete "the"

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*